United States Patent
Lozi et al.

(10) Patent No.: US 12,301,704 B1
(45) Date of Patent: May 13, 2025

(54) DIVERSIFIED PROTECTION OF CRYPTOGRAPHIC KEYS USING DEVICE IDENTIFICATION

(71) Applicant: American Express Travel Related Services Company, Inc., New York, NY (US)

(72) Inventors: Hicham Lozi, Palo Alto, CA (US); Rana Dasgupta, Scottsdale, AZ (US); Ramgopal Malathkar, Phoenix, AZ (US); Ajit Patra, Bangalore (IN); Amit Kumar Atap, Bangalore (IN); Abhijeet Dutta, Bengaluru (IN); Neelanjana Dasgupta, Phoenix, AZ (US); Ritwik Bhar, Chandannagar (IN); Sharma L. Putrevu, Bangalore (IN); Lei Ma, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 634 days.

(21) Appl. No.: 17/643,345

(22) Filed: Dec. 8, 2021

(51) Int. Cl.
| | |
|---|---|
| *H04L 9/08* | (2006.01) |
| *H04L 9/14* | (2006.01) |
| *H04L 9/32* | (2006.01) |
| *H04L 9/40* | (2022.01) |

(52) U.S. Cl.
CPC .......... *H04L 9/0822* (2013.01); *H04L 9/0866* (2013.01); *H04L 9/14* (2013.01); *H04L 9/3226* (2013.01); *H04L 63/0428* (2013.01)

(58) Field of Classification Search
CPC ....... H04L 9/0822; H04L 9/0866; H04L 9/14; H04L 9/3226; H04L 63/0428
See application file for complete search history.

(56) References Cited

U.S. PATENT DOCUMENTS

| | | | | |
|---|---|---|---|---|
| 8,737,623 | B2 * | 5/2014 | Hart | G06Q 20/3829 |
| | | | | 713/172 |
| 9,871,780 | B2 * | 1/2018 | Kusens | H04L 63/107 |
| 10,360,561 | B2 * | 7/2019 | Poon | G06Q 20/3229 |
| 10,546,119 | B2 * | 1/2020 | Kamal | H04L 9/0894 |
| 2014/0189808 | A1 * | 7/2014 | Mahaffey | G06F 21/6245 |
| | | | | 726/4 |

* cited by examiner

*Primary Examiner* — Sm A Rahman
(74) *Attorney, Agent, or Firm* — Sterne, Kessler, Goldstein, & Fox, P.L.L.C.

(57) ABSTRACT

Disclosed herein are system, method, and computer program product embodiments for providing a diversified cryptographic Root of Trust for application instances installed on different user devices. After installing an application, a client device transmits, to a cryptography server, (1) an application identification corresponding to a key from an operating system key store on the client device and (2) a device identification specific to an instance of the application on the client device. The cryptography server uses this data to generate and transmit a unique device fingerprint to the client device. The client device then diversifies a white-box cryptography (WBC) library using the application identification, the device identification, and the device fingerprint. The diversified WBC library protects the storage of cryptographic keys obtained from the cryptography server. These keys protect sensitive data on the client device and sensitive data sent to the cryptography server and other application servers.

20 Claims, 6 Drawing Sheets

DIVERSIFIED PROTECTION OF CRYPTOGRAPHIC KEYS USING DEVICE IDENTIFICATION

BACKGROUND

Field

This field is generally related to generating and protecting cryptographic keys used for software application communications.

Related Art

Software applications are commonly installed and used by mobile devices. Users of the mobile devices typically interact with the software applications to connect to application servers over the Internet to access application functionality. The applications on the mobile devices communicate with application servers via encrypted communications. These encrypted communications are messages encrypted using cryptographic keys. Sensitive data can also reside temporarily or permanently on the device and need to be protected by encryption. Application developers often include keys with the application to perform such protection.

BRIEF SUMMARY

Disclosed herein are system, apparatus, device, method and/or computer program product embodiments, and/or combinations and sub-combinations thereof, for providing a diversified Root of Trust for different application instances installed on different user devices.

One problem that may arise when different user devices install the same application is that different instances of the application use the same key or keys. That is, different mobile devices used by different users may have downloaded different instances of the application but still use the same cryptographic keys for communication. In this case, a vulnerability may exist that may affect the users of the application. In particular, if a malicious user or hacker accesses one device's keys, even if the keys are encrypted, the malicious user may use the same key on a different device. This creates a vulnerability because the same key or keys are used among the different devices using the application.

One instance where this vulnerability arises is in the context of a Software Mobile Root of Trust (SMRoT). A SMRoT is a protected portion of the application code and is usually packaged as a library. The library may use White-Box Cryptography (WBC) to protect cryptographic keys. In conventional software applications, the SMRoT library is pre-rooted during the build phase of the software application. A key is inserted at application build time as a Root of Trust for the SMRoT library before the application is uploaded to an Internet-based application store or application exchange. This process ties the Root of Trust to a particular version or release of the application. Further, this causes the previously described vulnerability where different application instances installed on different devices are protected by the same Root of Trust. This results in the application being vulnerable to code or data lifting attacks.

To reduce these vulnerabilities, a diversified Root of Trust for different application instances installed on different user devices may be provided. A diversified Root of Trust is determined after a client device has downloaded, installed, and/or initialized the application. The user device completes a login process with a cryptography server managing the generation of cryptographic keys. The user device may provide to the cryptography server (1) an application identification corresponding to a key from an operating system key store on the client device and (2) a device identification specific to an instance of the application on the client device. The cryptography server then computes a device fingerprint using the application identification and the device identification and transmits the device fingerprint to the client device. The client device then uses the application identification, the device identification, and the device fingerprint as a unique Root of Trust that is unique to that particular client device. The client device then applies the application identification, the device identification, and the device fingerprint to a white-box cryptography (WBC) library as a diversified Root of Trust to uniquely bootstrap the WBC library for protecting cryptographic keys.

After configuring the WBC library on the client device, the client device may request a set of cryptographic keys from the cryptography server. These cryptographic keys may be working keys used to encrypt sensitive data communicated with the backend application servers or the cryptography server. They may also be used as a digital signature for communications and/or to protect sensitive data on the client device or servers. The client device may uniquely identify itself with the request by sending the device fingerprint and/or a unique identification including the device fingerprint. The cryptography server may then provide the requested keys for use by the client device to encrypt subsequent communications.

This process resolves the issues with the previously described conventional application cryptography systems. For example, in previous systems, to change a Root of Trust for a particular application, developers would have needed to provide an updated version of the application for download by users. This inefficiency is resolved with the process described herein because a diversified Root of Trust may be generated for individual client devices. This protects against malicious attacks by having unique key protection for each client device. Because the Root of Trust for a particular application instance is generated using data unique to a client device, client devices have better protection against code and/or data uplift attacks. For example, if one client device is compromised by a malicious attacker, other client devices do not suffer the same vulnerabilities because the other client devices have implemented different and unique Roots of Trust.

Additionally, delaying the key establishment protocol until after a user has successfully logged-in provides increased system security as well. The cryptography server may wait until a user has successfully logged-in prior to providing cryptographic keys for communications. This may allow the cryptography server to authenticate the application user and avoid providing keys to any user that downloads the application. This would therefore discourage malicious attackers from simply downloading the application from a digital application store, exchange, or marketplace.

Delaying the key establishment protocol until after a login process also allows for enriched policy setting at the cryptography server or at a policy server. The policy may define login scenarios with corresponding actions. The policy may be generated by performing a risk assessment based on contextual information. For example, the policy may identify situations corresponding to a number of incorrect login attempts or a suspicious IP address. Some policies may include determining not to proceed with a key bootstrapping process. This may disable a portion of the application, such as portions communicating sensitive data. In some scenarios, less risky functionality may still be operable. Another policy may identify application reinstalls and initializations and provide new keys even through the application version has not changed. This may aid to prevent attacks corresponding to trial and error. Another policy may shutout device bootstrapping when a number of initializations within a time period have exceeded a threshold. In this manner, policy data based on login credentials may also aid in securing the generation of cryptographic keys.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, providing a diversified Root of Trust for different application instances installed on different user devices. As further described below, different client devices, such as mobile devices, using applications may use a diversified Root of Trust generated based on an application identification, a device identification, and/or a fingerprint generated by a cryptography server. These components may provide diversification unique to each client device and/or application instance. The client device may inject the diversified Root of Trust into a white-box cryptography (WBC) component of a Software Mobile Root of Trust (SMRoT) library at the application. After configuring the WBC library on the client device, the client device may request one or more cryptographic keys from the cryptography server. The cryptography server may then provide the requested keys to the client device to encrypt subsequent communications and store sensitive data locally. The requested keys may be in a WBC format. In this manner, the client device is configured to use its unique Root of Trust with the WBC library to protect cryptographic keys received from the cryptography server. This unique Root of Trust with the WBC library therefore provides protection unique to the client device even if it is using an application common to multiple client devices.

Various embodiments of these features will now be discussed with respect to the corresponding figures.

Figure 1:
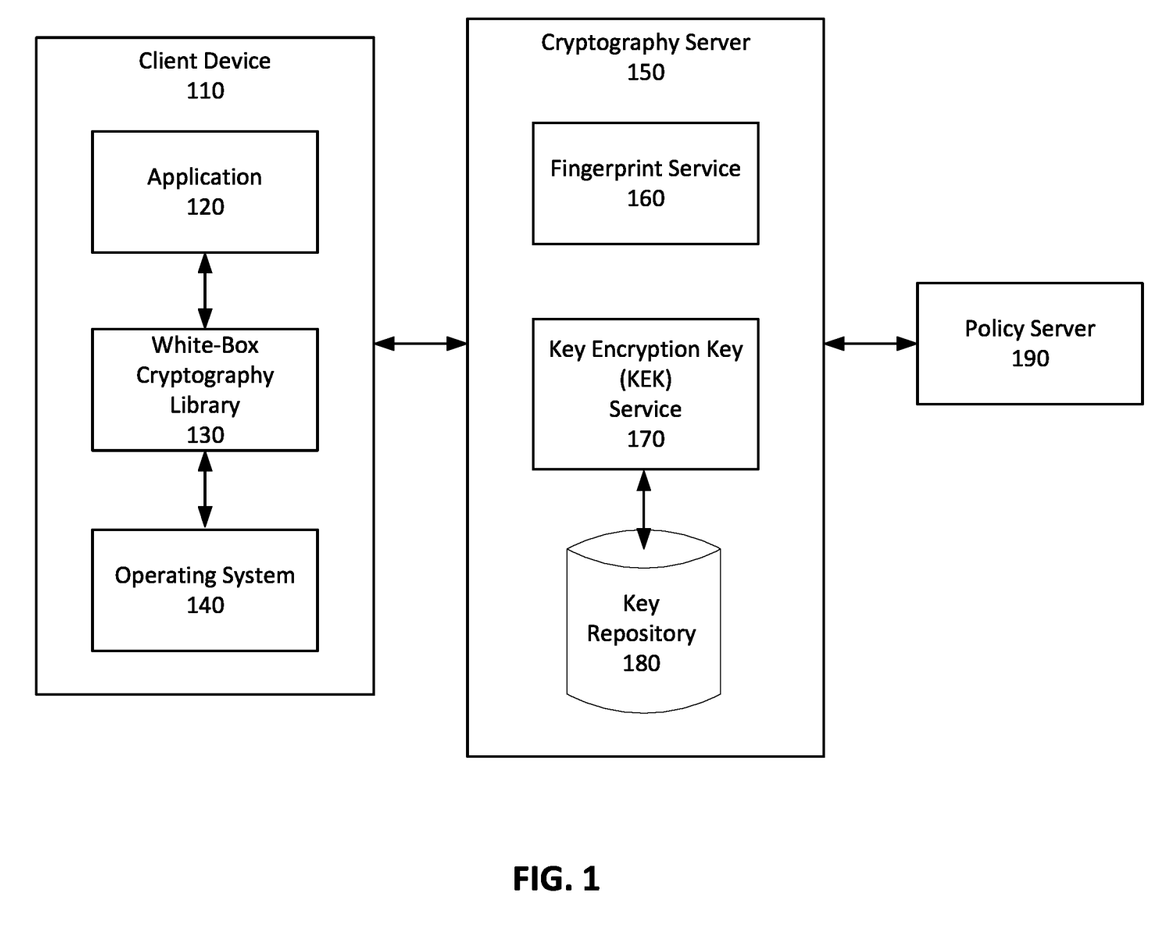
FIG. 1 depicts a block diagram of an application cryptography environment, according to some embodiments.

FIG. 1 depicts a block diagram of an application cryptography environment 100, according to some embodiments. Application cryptography environment 100 includes client device 110, cryptography server 150, and/or policy server 190. Client device 110 includes application 120, white-box cryptography (WBC) library 130, and/or operating system 140. Cryptography server 150 includes fingerprint service 160, key encryption key (KEK) service 170, and/or key repository 180.

Client device 110 may be a computer system such computer system 600 described with reference to FIG. 6. For example, client device 110, may be a personal digital assistant (PDA), desktop workstation, laptop or notebook computer, netbook, tablet, smart phone, smart watch, and/or other mobile communication device. Client device 110 may include one or more processors and/or memory. Client device 110 may also include an operating system 140. Operating system 140 may manage the interaction between the hardware and software of client device 110. To provide additional functionality, client device 110 may be configured to download and/or install application 120.

Application 120 may be downloaded from an application store, application exchange, and/or application marketplace. In some embodiments, application 120 may be downloaded from a website and/or loaded into client device 110 locally. For example, a user may connect client device 110 to another computer system and/or a memory device to load application 120 onto client device 110. Application 120 may be a software executable providing software functionality to client device 110. This functionality may include Internet-based capabilities with communications to an application server. Cryptography server 150 may also provide this functionality. For example, application 120 may be a banking application, an email application, a social media application, gaming application, and/or other Internet-based application. Application 120 may also facilitate a login process to authenticate user credentials with a server providing functionality for application 120.

As previously explained, as part of providing the Internet-based functionality of application 120 to client device 110, application 120 may communicate with one or more remote servers and/or databases. The one or more remote servers may include cryptography server 150. In some embodiments, the one or more remote servers may be implemented using computer system 600. Client device 110 may communicate with the one or more remote servers using encrypted communications. For example, client device 110 and/or the one or more remote servers may encode messages using cryptographic keys. In some embodiments, cryptography server 150 may provide working keys to client device 110 to use for encrypting sensitive data. Client device 110 may transmit a request to cryptography server 150 for the one or more working keys. Client device 110 may then use the working keys for encrypting communications. For example, client device 110 may encrypt confidential information, such as a credit card number, social security number, and/or other private data using the one or more working keys. In some embodiments, client device 110 may also use the one or more working keys as a digital signature to verify communications. Cryptography server 150 may verify these digital signatures. Client device 110 may then transmit the encrypt communications to cryptography server 150. Cryptography server 150 may decrypt the received communications using the one or more working keys previously provided.

As part of this process, cryptography server 150 and/or client device 110 may be configured to protect the working keys. For example, cryptography server 150 and/or client device 110 may seek to prevent access to the working keys that are in use and/or stored on a device. To provide this protection, client device 110 and/or cryptography server 150 may use white-box cryptography (WBC). WBC aims to protect cryptographic keys in untrusted environments where attackers may gain control over hardware and software implementation on a device. WBC may use mathematical techniques as well as code obfuscation techniques to hide a key in an algorithm implementation. For example, WBC may blend cryptographic keys into application code, such as the code of application 120. Client device 110 may implement WBC to protect the working keys using WBC library 130. WBC library 130 may be provided with application 120 and/or as a part of application 120. In some embodiments, WBC library 130 may implement an Advanced Encryption Standard (AES) algorithm that hides a key value using mathematical obfuscation (e.g., bijections and/or noise) and/or code obfuscation.

To provide the previously described protection for working cryptographic keys, client device 110 may use a process for diversifying a Root of Trust for WBC library 130. The Root of Trust may be a trusted value within the cryptographic system used to initialized, seed, and/or configure WBC library 130. The diversification process described herein generates a Root of Trust unique to client device 110. This unique Root of Trust as applied to WBC library 130 provides protection for the working cryptographic keys. Further, because the Root of Trust is unique to each client device 110, if one client device 110 is compromised by a malicious attacker, other client devices 110 will not similarly be compromised because they utilize different Roots of Trust. In this manner, client device 110 vulnerabilities may be lessened by diversifying the Root of Trust for each client device 110 even though the client device 110 may use the same application 120 with the same application code. The client devices 110 using different instances of application 120 may generate different Roots of Trust for diversifying the WBC library 130. Cryptography server 150 may also identify these different Roots of Trust for the different client devices 110 and provide working keys to the different client devices 110 accordingly.

To diversify the Root of Trust for a client device 110, three data sources may be used: (1) an application identification; (2) a device identification; and (3) a device fingerprint.

The application identification may be data corresponding to a key store included in operating system 140 of client device 110. For example, the application identification may be a key generated and stored in the key store. Using this key may take advantage of the existing securing on a client device 110. For example, if a malicious attacker gains access to storage on client device 110 and extracts the protected keys, the keys may not be decrypted unless the malicious attacker has also obtained the application identification value stored in the key store. This value may also be referred to as a keystoreID. In some embodiments, application 120 may use the key store in operating system 140 to generate the application identification. The key store protects the generated application information. In some embodiments, client device 110 may provide the application identification to cryptography server 150 in a JSON Web Token (JWT) as a header during an API call to request a device fingerprint as further described below. In some embodiments, the JWT may be in a specific format depending on or corresponding to an identity provider.

The device identification may be data specific to the instance of application 120 on client device 110. The device identification may be a unique identifier generated by combining operating system 140 identifier (OS ID) functionality with globally unique identifier (GUID) generation. Client device 110, operating system 140, and/or application 120 may generate this device identification during installation of application 120 at client device 110. The device identification may uniquely identify application 120 and/or may be unique to each installation instance of application 120. The device identification therefore provides protection unique to the particular installation instance of application 120. In some embodiments, client device 110 may provide the device identification within the JWT token transmitted to cryptography server 150 as described above.

The device fingerprint may be a value generated by fingerprint service 160 at cryptography server 150. Cryptography server 150 may receive the application identification and/or the device identification from client device 110. Fingerprint service 160 may generate the device fingerprint by applying a cryptographic algorithm to the application identification and/or the device identification. In some embodiments, fingerprint service 160 may encode the application identification and the device identification using the cryptographic algorithm to generate the device fingerprint. Cryptography server 150 may store the device fingerprint with a mapping to client device 110 to maintain a one-to-one relationship. Cryptography server 150 may also transmit the device fingerprint to client device 110 to use for diversifying WBC library 130. Client device 110 may cache the device fingerprint in application 120 during use. In some embodiments, when client device 110 is restarted, client device 110 may retrieve the device fingerprint again from cryptography server 150. The communication of the application identification, the device identification, and/or the device fingerprint may occur using an Elliptic-curve Diffie-Hellman (ECDH) key agreement protocol to establish a secure communication channel.

In some embodiments, cryptography server 150 generates the device fingerprint after client device 110 has completed a login process and/or after a user has been authenticated. Generating the device fingerprint may occur after a successful mutual Transport Layer Security (TLS) authentication. To authenticate the user, cryptography server 150 may receive login credentials from client device 110, such as a username and/or password. The login credentials may be received via application 120. Cryptography server 150 may check and/or query policy server 190 to determine whether to authenticate the user. In some embodiments, policy server 190 may be a separate server from cryptography server 150. In some embodiments, policy server 190 may be integrated into a common system and/or share a common server with cryptography server 150.

Policy server 190 may include a database of policies related to login credentials and/or login attempts. The policies may define login scenarios with corresponding actions and/or login restrictions. Policies may be defined based on a risk assessment based on contextual information corresponding to client device 110 and/or the provided login credentials. For example, a policy may identify situations corresponding to a number of incorrect login attempts or a suspicious IP address corresponding to client device 110. Some policies may define scenarios not to proceed with a key bootstrapping process. For example, the policy may prevent cryptography server 150 from transmitting one or more cryptographic keys. This may disable a portion of application 120, such as portions communicating sensitive data from client device 110 to cryptography server 150. In some scenarios, less risky functionality may still be operable. Another policy may identify application reinstalls and initializations and provide new keys even through the application version has not changed. This may aid to prevent attacks corresponding to trial and error. Another policy may shutout client device 110 bootstrapping when a number of initializations within a time period have exceeded a threshold. In this manner, policy server 190 and/or policy data based on login credentials may also aid in securing the generation of cryptographic keys by cryptography server 150.

After receiving the device fingerprint from cryptography server 150, client device 110 may apply the application identification, the device identification, and the device fingerprint to WBC library 130 as a Root of Trust. As previously explained, injecting these sources of diversity into WBC library 130 may provide diversity unique to client device 110. Client device 110 may then use WBC library 130 to protect one or more received cryptographic keys from cryptography server 150 and store the protected keys in memory on client device 110.

For example, client device 110 may use an API call to request one or more cryptographic keys from cryptography server 150. Client device 110 may provide the device fingerprint with this API call to identify itself. Cryptography server 150 may retrieve the requested one or more cryptographic keys from key repository 180. As will be further explained below, the one or more cryptographic keys may be protected by a key encryption key (KEK) and KEK service 170 prior to storage in key repository 180. The one or more cryptographic keys may also be designated for client device 110 when stored in key repository 180. Cryptography server 150 may retrieve this keys and provide them to client device 110 when requested.

After receiving the requested cryptographic keys, client device 110 may apply WBC library 130 to the one or more cryptographic keys. Client device 110 may then store the protected versions of the cryptographic keys in memory until they are used to provide encrypted communications to cryptography server 150. Client device 110 may then decrypt these keys and use them when communicating data to cryptography server 150 via application 120. For example, client device 110 may encrypt confidential and/or sensitive data using the one or more cryptographic keys generated by cryptography server 150. In this manner, client device 110 may have a diversified storage mechanism using WBC library 130 to store the requested one or more cryptographic keys.

Returning to the cryptography server 150, cryptography server 150 may generate and/or store the one or more cryptographic keys. The one or more cryptographic keys may be referred to as working keys or data encryption keys (DEKs). The working keys may be stored and/or cached using a WBC library and KEK service 170. KEK service 170 may use a KEK which may be obtained from a central keystore. For example, for a particular client device 110, cryptography server 150 may generate a set of working keys. The set of working keys may be protected by a WBC library and wrapped using a KEK to generate a set of wrapped keys. KEK service 170 may perform this wrapping and/or encryption of the working keys. The KEK may be unique to the device fingerprint and/or to the client device 110. In this manner, key repository 180 may store multiple sets of working keys that have each been encrypted using different KEKs that are specific to different client devices 110. Key repository 180 may also store the KEKs in a WBC secure format. In some embodiments, the KEKs may be cached.

When a client device 110 requests working keys or one or more cryptographic keys from cryptography server 150, KEK service 170 may retrieve the working keys generated for the client device 110 from key repository 180. KEK service 170 may then unwrap and/or decrypt the wrapped one or more cryptographic keys using the KEK corresponding to client device 110. This may be determined based on the device fingerprint provided by client device 110 to cryptography server 150. For example, cryptography server 150 may index the working keys corresponding to the device fingerprint. Cryptography server 150 may then provide the one or more unwrapped cryptographic keys to client device 110 as working keys to provide secure communications and/or data. Cryptography server 150 may provide the one or more cryptographic keys in a WBC format. For example, after unwrapping the one or more cryptographic keys using the KEK, cryptography server 150 may translate the one or more cryptographic keys to a WBC format corresponding to WBC library 130. In this manner, client device 110 may identify and/or decrypt the received working keys using WBC library 130. This process also establishes a secure communication channel between cryptography server 150 and client device 110. In some embodiments, the KEKs may be imported into a WBC library at cryptography server 150. In some embodiments, cryptography server 150 may provide the one or more unwrapped cryptographic keys using the ECDH protocol previously described. As previously explained, when client device 110 receives the working keys, client device 110 may locally store the working keys using WBC library 130 for protection.

In some embodiments, cryptography server 150 may rotate KEKs. For example, cryptography server 150 and/or policy server 190 may define a security policy for rotating KEKs after an amount of time has elapsed or according to a periodic time interval. For example, KEKs may be rotated every five years. Rotating the KEKs may provide additional protection against malicious attackers.

In some embodiments cryptography server 150 may include a software development kit (SDK) that is installed on other servers and/or applications that may also interact with application 120. For example, if application 120 is a banking or credit card application, another application may be a loyalty program managed by another server. This other server may use API calls or other functional calls via an SDK to obtain the one or more cryptographic keys or working keys from cryptography server 150 corresponding to client device 110, with which this other server is now interacting. The other server may obtain these working keys to support secure communications with client device 110 as a user interacts with application 120. Client device 110 may use the working keys received from cryptography server 150 to securely communicate with this other server as well.

Figure 2:
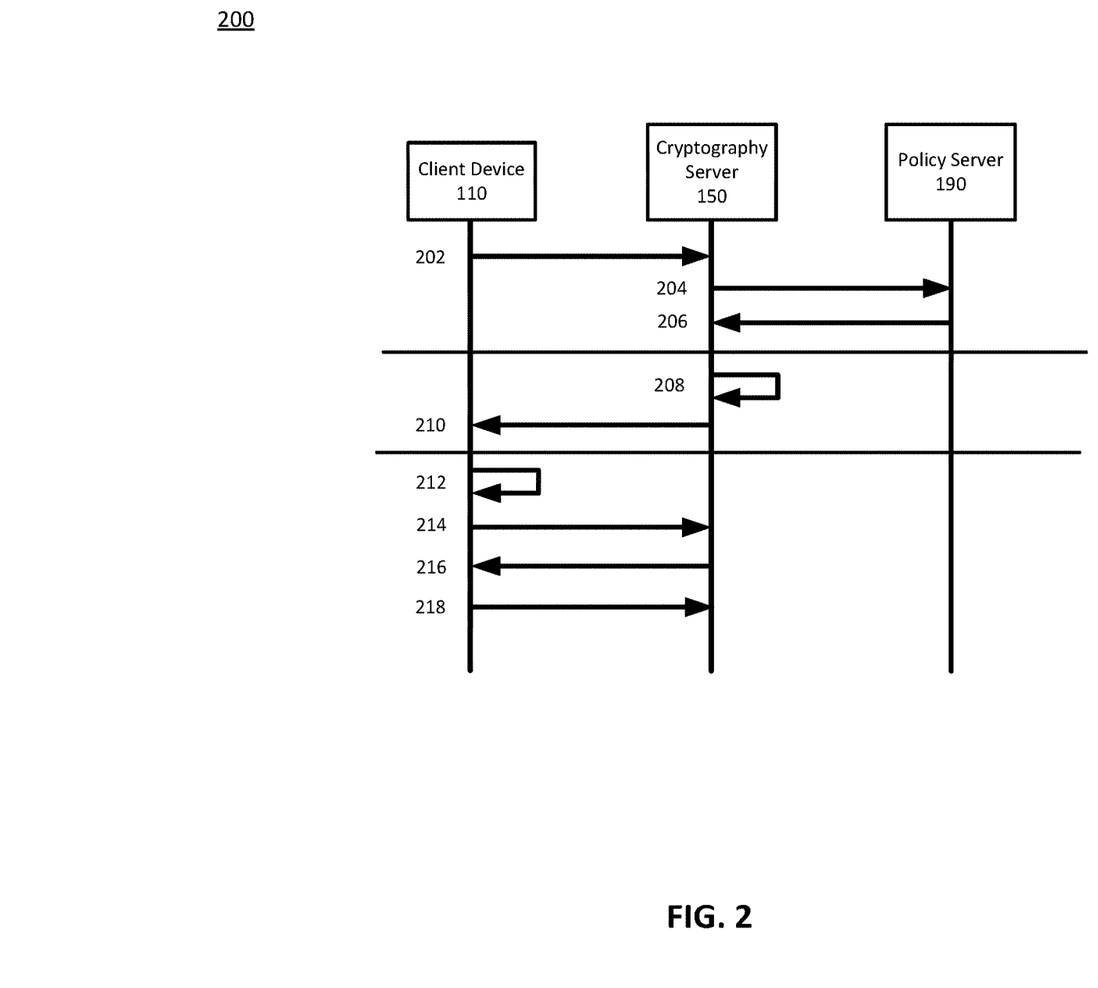
FIG. 2 depicts a flow diagram depicting interactions between a client device, a cryptography server, and a policy server, according to some embodiments.

FIG. 2 depicts a flow diagram 200 depicting interactions between a client device 110, a cryptography server 150, and a policy server 190, according to some embodiments. Client device 110, cryptography server 150, and/or policy server 190 may operate as described with reference to FIG. 1. Flow diagram 200 provides an embodiment outlining an interaction between the systems to establish a Root of Trust at client device 110 and/or to provide client device 110 with one or more cryptographic keys for secure communications with cryptography server 150.

At 202, 204, and 206, client device 110 may perform a login process for application 120. For example, at 202, client device 110 may transmit one or more login credentials to cryptography server 150. Client device 110 may also transmit an application identification and/or a device identification as previously explained. Cryptography server 150 may cache this information for use when the login process is completed.

At 204, cryptography server 150 may query and/or interrogate policy server 190. Policy server 190 may define a policy for determining whether to authenticate client device 110. Example policies were previously described. In some embodiments, policy server 190 may confirm login credentials, such as determining that an expected password matches a provided username. In some embodiments, policy server 190 may reject login attempts even when an expected password matches a provided username. For example, this may occur when a login attempt has been flagged as suspicious for having too many failed login attempts. In this manner, the policy server 190 may restrict access to application 120. In some embodiments, policy server 190 may strict access to certain portions of application 120. For example, policy server 190 may indicate to cryptography sever 150 that certain functions related to confidential and/or sensitive data should be restricted. In this manner, cryptography server 150 may avoid providing cryptographic keys or working keys corresponding to such functions. At 206, policy server 190 may provide an authentication instruction. This instruction may be to authenticate client device 110 to allow application 120 functionality, reject client device 110 from application 120 functionality, and/or allow client device 110 to access limited and/or a subset of application 120 functionality.

At 208, if policy server 190 has permitted authentication of client device 110, cryptography server 150 may generate a device fingerprint unique to client device 110. This may occur when client device 110 is authenticated to access application 120 and/or a subset of application 120 functionality. As previously explained cryptography server 150 may generate the device fingerprint using the application identification and/or the device identification. Cryptography server 150 may store the device fingerprint, the application identification, and/or the device identification in memory. In some embodiment, cryptography server 150 may store the device fingerprint as an index with an association with one or more cryptographic keys used for secure communications. At 210, cryptography server 150 may transmit the device fingerprint to client device 110.

At 212, client device 110 may use the application identification, the device identification, and the device fingerprint to diversify WBC library 130. As previously explained, this diversification may provide encryption and protect cryptographic keys uniquely for client device 110. At 214, client device 110 may transmit a request for one or more cryptographic keys to cryptography server 150. This request may include the device fingerprint to uniquely identify client device 110. Using the device fingerprint, cryptography server 150 may identify one or more cryptographic keys assigned to client device 110. As previously explained, cryptography server 150 may unwrap the one or more cryptographic keys using a KEK. Cryptography server 150 may apply a WBC library corresponding to WBC library 130 to the one or more cryptographic keys to encrypt the keys. These one or more cryptographic keys may be the working keys previously described.

At 216, cryptography server 150 may transmit the one or more cryptographic keys to client device 110. These one or more cryptographic keys may be protected in a WBC format. Client device 110 may store the one or more cryptographic keys using WBC library 130. Client device 110 may use the one or more cryptographic keys to encrypt secure communications with cryptography server 150. At 218, client device 110 may transmit a secure message to cryptography server 150 which may be encrypted and/or signed using a cryptographic key provided by cryptography server 150. The transmission of this message may occur when a user interacts with application 120 to provide data to cryptography server 150. In this manner, the transmissions may be encrypted using the one or more keys provided by cryptography server 150.

Figure 3:
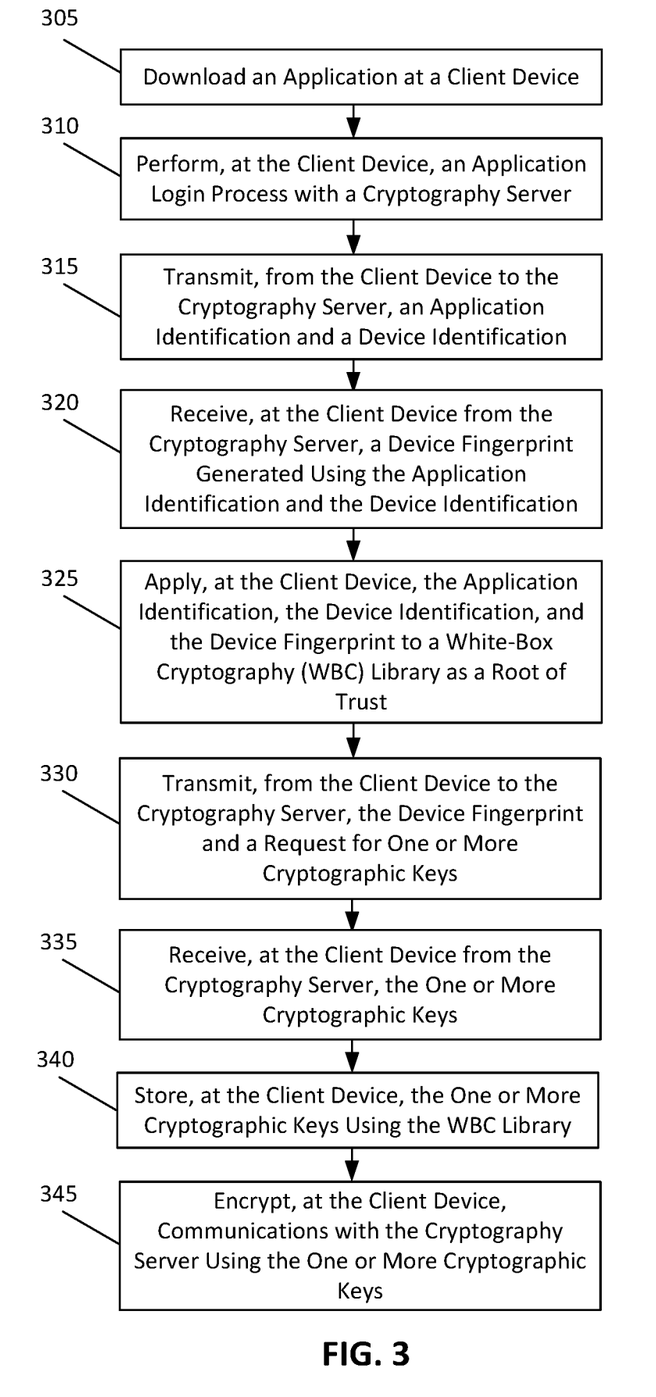
FIG. 3 depicts a flowchart illustrating a method for configuring cryptographic keys for a client device, according to some embodiments.

FIG. 3 depicts a flowchart illustrating a method 300 for configuring cryptographic keys for a client device 110, according to some embodiments. Method 300 shall be described with reference to FIG. 1; however, method 300 is not limited to that example embodiment.

In an embodiment, client device 110 may utilize method 300 to diversify WBC library 130 and to obtain one or more cryptographic keys for secure communications with cryptography server 150. The foregoing description will describe an embodiment of the execution of method 300 with respect to client device 110. While method 300 is described with reference to client device 110, method 300 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

At 305, client device 110 may download application 120. This downloading may occur from a digital application store, application exchange, and/or application marketplace accessible via the Internet. In some embodiments, application 120 may be downloaded from a website and/or loaded into client device 110 using a physical connection. For example, a user may connect client device 110 to another computer system and/or a memory device to load application 120 onto client device 110.

At 310, client device 110 may perform an application login process with cryptography server 150. Application 120 may facilitate the transmission of login credentials to cryptography server 150. The login credentials may include a username and password. In some embodiments, the login process may include a challenge or verification code. For example, a verification code may be separately transmitted via a text message, phone call, or email to client device 110. The user may then enter this verification code in application 120 as part of the application login process.

At 315, client device 110 may transmit an application identification and a device identification to cryptography server 150. This may occur before, during, or after the login process. As previously explained, the application identification may correspond to a key from an operating system key store on client device 110. Client device 110 may generate the key and protect the key in the key store. The device identification may correspond to the specific instance of application 120 installed on client device 110. The device identification may be a unique identifier generated by combining operating system 140 identifier (OS ID) functionality with globally unique identifier (GUID) generation. In some embodiments, client device 110 may transmit the application identification in the header of a JWT token during an API call to request a device fingerprint. The device identification may be provided within the token.

At 320, client device 110 may receive, from cryptography server 150, a device fingerprint generated using the application identification and the device identification. Client device 110 may store the device fingerprint in memory and/or use this device fingerprint to uniquely identify itself during communications with cryptography server 150. As previously explained, cryptography server 150 may generate the device fingerprint by applying a cryptographic algorithm to the application identification and/or the device identification. In some embodiments, fingerprint service 160 may encode the application identification and the device identification using the cryptographic algorithm to generate the device fingerprint.

At 325, client device 110 may apply the application identification, the device identification, and the device fingerprint to WBC library 130 as a Root of Trust. As previously explained, using these sources of diversity may allow client device 110 to configure WBC library 130 in a manner that is unique to client device 110. Client device 110 may then use WBC library 130 to protect one or more received cryptographic keys from cryptography server 150 and store the protected keys in memory on client device 110.

At 330, client device 110 may transmit, to cryptography server 150, the device fingerprint and a request for one or more cryptographic keys. In some embodiments, the one or more cryptographic keys may be working keys and/or may be in a WBC format. As previously explained, the one or more cryptographic keys may be used to encrypt secure communications with cryptography server 150.

At 335, client device 110 may receive the one or more cryptographic keys from cryptography server 150. At 340, client device 110 may store the one or more cryptographic keys using WBC library 130. As previously explained, after receiving the requested cryptographic keys, client device 110 may apply WBC library 130 to the one or more cryptographic keys. The may encrypt the one or more cryptographic keys using the previously diversified WBC library 130. This encryption may then allow client device 110 to store protected versions of the cryptographic keys in memory until they are used to provide encrypted communications to cryptography server 150. In this manner, client device 110 may have a diversified storage mechanism using WBC library 130 to store the requested one or more cryptographic keys.

At 345, client device 110 may encrypt communications with cryptography sever 150 using the one or more cryptographic keys. Client device 110 may decrypt the stored keys using WBC library 130. Client device 110 may then use the one or more cryptographic keys when communicating data to cryptography server 150 via application 120. For example, client device 110 may encrypt confidential and/or sensitive data using the one or more cryptographic keys generated by cryptography server 150.

Figure 4:
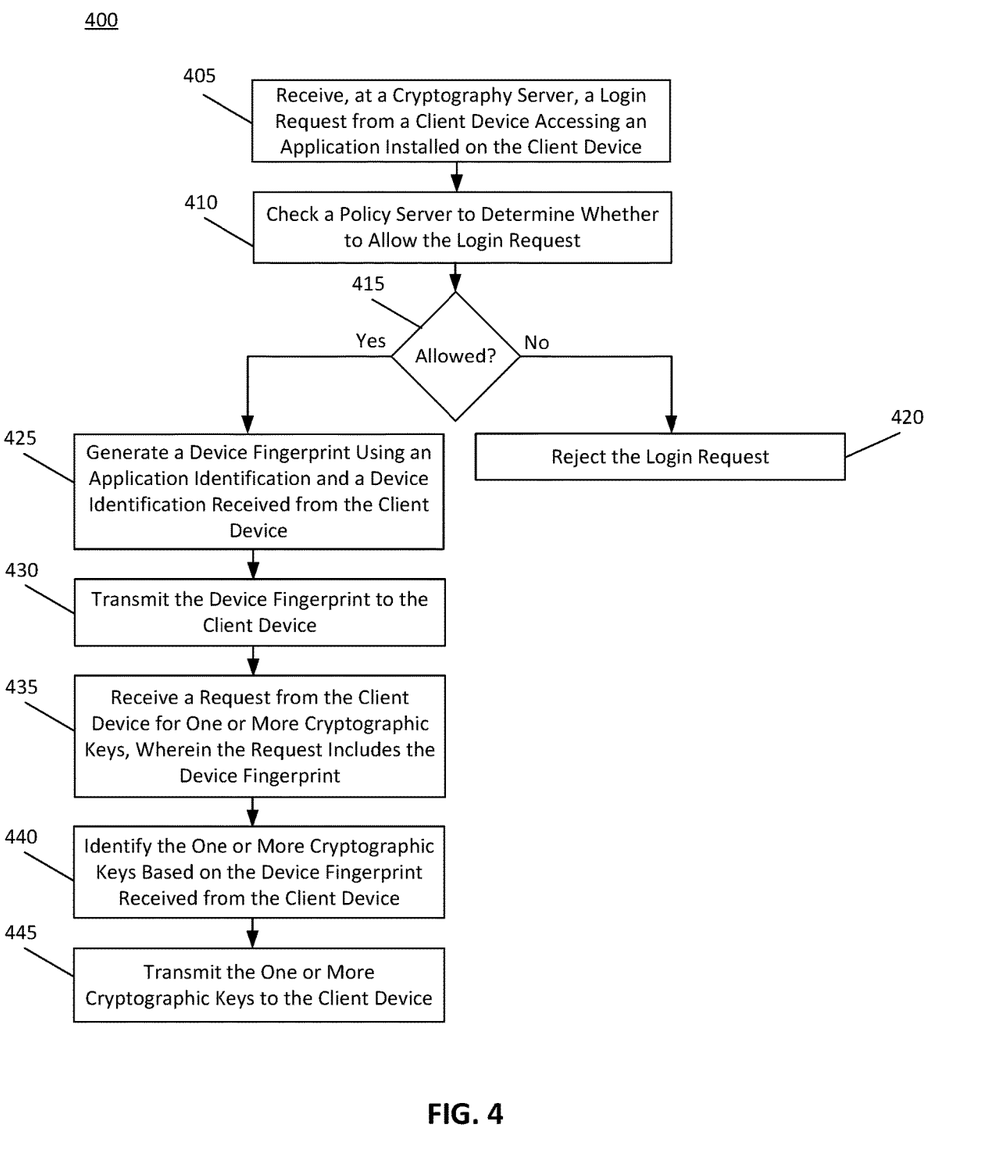
FIG. 4 depicts a flowchart illustrating a method for configuring cryptographic keys at a cryptography server, according to some embodiments.

FIG. 4 depicts a flowchart illustrating a method 400 for configuring cryptographic keys at a cryptography server 150, according to some embodiments. Method 400 shall be described with reference to FIG. 1; however, method 400 is not limited to that example embodiment.

In an embodiment, cryptography server 150 may utilize method 400 to generate one or more cryptographic keys for client device 110. The foregoing description will describe an embodiment of the execution of method 400 with respect to cryptography server 150. While method 400 is described with reference to cryptography server 150, method 400 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4, as will be understood by a person of ordinary skill in the art.

At 405, cryptography server 150 may receive a login request from client device 110 accessing application 120 installed on client device 110. As previously explained, this login request may include user credentials and/or other user identification. In some embodiments, the login request may include an application identification and/or a device identification as previously described.

At 410, cryptography server 150 may check policy server 190 to determine whether to allow the login request. This may include a verification of the login credentials and/or determining whether any login restrictions correspond to the provided login credentials. In some embodiments, policy server 190 may indicate whether any functionality of application 120 should be limited. This may dictate whether cryptography server 150 provides requested cryptographic keys to client device 110.

At 415, if policy server 190 indicates that the login request is restricted and/or not allowed, cryptography server 150 may reject the login request at 420. For example, cryptography server 150 may transmit a notification to client device 110 informing the user that the login request has been rejected. In some embodiments, this rejection may be for a portion of functionality at application 120. In this case, the user may still be able to interact with less risky portions of application 120. The user may be prevented from accessing portions related to the transmission of sensitive or confidential data which may rely on the use of cryptographic keys for transmission. Cryptography server 150 may prevent access to this functionality by not providing requested keys to client device 110.

At 425, if policy server 190 indicates that the login request is allowed and/or that no login restrictions correspond to the login credentials, cryptography server 150 may generate a device fingerprint using an application identification and a device identification received from client device 110. The application identification and/or the device identification may have been received with the login request. In some embodiments, the application identification and the device identification may be received in a separate request from client device 110 when it requests a device fingerprint. This may occur via an API call. As previously explained, cryptography server 150 may generate the device fingerprint by applying a cryptographic algorithm to the application identification and/or the device identification. In some embodiments, fingerprint service 160 may encode the application identification and the device identification using the cryptographic algorithm to generate the device fingerprint.

At 430, cryptography server 150 may transmit the device fingerprint to client device 110. Client device 110 may store the device fingerprint in memory. Client device 110 may also inject the device fingerprint with the application identification and the device identification into WBC library 130 for diversification.

At 435, cryptography server 150 may receive a request from client device 110 for one or more cryptographic keys, wherein the request includes the device fingerprint. At 440, cryptography server 150 may identify the one or more cryptographic keys based on the device fingerprint received from client device 110. For example, cryptography server 150 may have generated the one or more cryptographic keys and stored them with an index corresponding to the device fingerprint. Cryptography server 150 may identify the one or more cryptographic keys based on this index. In some embodiments, the one or more cryptographic keys may have been wrapped using a KEK corresponding to client device 110. Cryptography server 150 may identify the corresponding KEK based on the device fingerprint and unwrap the one or more cryptographic keys using the identified KEK. At 445, cryptography server 150 may transmit the one or more cryptographic keys to client device 110.

Figure 5:
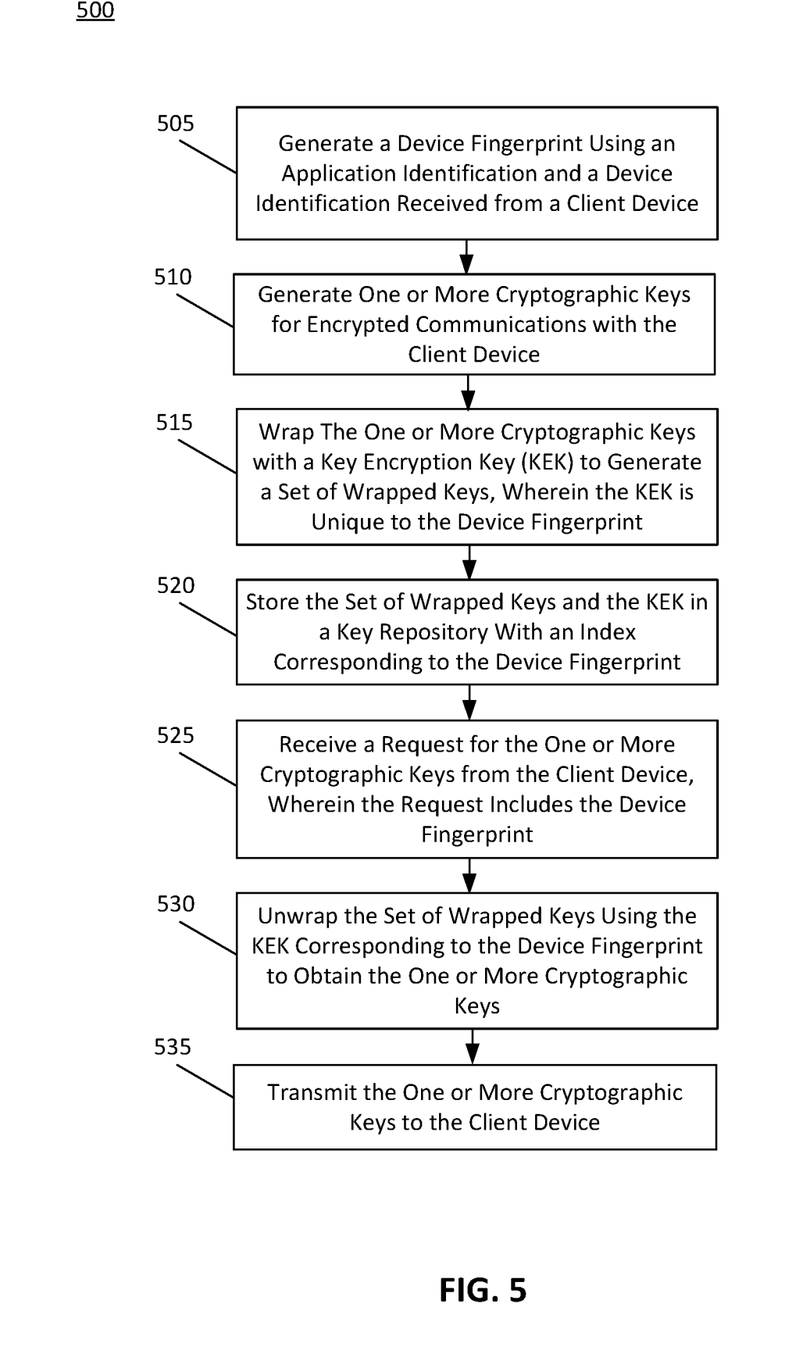
FIG. 5 depicts a flowchart illustrating a method for storing cryptographic keys at a cryptography server, according to some embodiments.

FIG. 5 depicts a flowchart illustrating a method 500 for storing cryptographic keys at a cryptography server 150, according to some embodiments. Method 500 shall be described with reference to FIG. 1; however, method 500 is not limited to that example embodiment.

In an embodiment, cryptography server 150 may utilize method 500 to protect and store one or more cryptography keys to be used by client devices 110 for secure communications. The foregoing description will describe an embodiment of the execution of method 500 with respect to cryptography server 150. While method 500 is described with reference to cryptography server 150, method 500 may be executed on any computing device, such as, for example, the computer system described with reference to FIG. 6 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5, as will be understood by a person of ordinary skill in the art.

At 505, cryptography server 150 may generate a device fingerprint using an application identification and a device identification received from a client device 110. As previously explained, cryptography server 150 may generate the device fingerprint by applying a cryptographic algorithm to the application identification and/or the device identification. In some embodiments, fingerprint service 160 may encode the application identification and the device identification using the cryptographic algorithm to generate the device fingerprint.

At 510, cryptography server 150 may generate one or more cryptographic keys for encrypted communications with client device 110. In some embodiments, the cryptographic keys may be in a WBC format. As previously explained, these one or more cryptographic keys may be working keys and/or data encryption keys (DEKs) used to encrypt sensitive or confidential data. In some embodiments, cryptography server 150 may pre-generate keys and assign them to client device 110 at 510.

At 515, cryptography server 150 may wrap the one or more cryptographic keys with a key encryption key (KEK) to generate a set of wrapped keys. KEK service 170 may perform this wrapping. The KEK may be unique to the device fingerprint. The KEK may therefore be unique to a particular client device 110. As previously explained, the KEK may operate in a WBC environment to protect the one or more cryptographic keys. For example, the KEKs may be cached and imported into a WBC library at cryptography server 150. To wrap the one or more cryptographic keys, KEK service 170 may encrypt or encapsulate the one or more cryptographic keys using the KEK. In some embodiments, KEK service 170 may apply a key wrap or encryption algorithm to perform the wrapping. The key wrapping may occur using symmetric and/or asymmetric encryption.

At 520, cryptography server 150 may store the set of wrapped keys and the KEK in key repository 180 with an index corresponding to the device fingerprint. Key repository 180 may be one or more databases configured to store keys. The storage of the KEKs may be protected by a WBC library as well. In some embodiments, while storing the set of wrapped keys and the KEK, cryptography server 150 may rotate the KEK based on a predetermine security policy. In this case, cryptography server 150 may rewrap the one or more cryptographic keys with a new KEK corresponding to the device fingerprint. The index may be updated to reflect the new KEK while still identifying the set of wrapped keys.

At 525, cryptography server 150 may receive a request for the one or more cryptographic keys from client device 110. The request may include the device fingerprint. Cryptography server 150 may use the index and the device fingerprint to identify the one or more cryptographic keys and/or the KEK.

At 530, cryptography server 150 may unwrap the set of wrapped keys using the KEK corresponding to the device fingerprint to obtain the one or more cryptographic keys. KEK service 170 may perform this unwrapping. KEK service 170 may unwrap and/or decrypt the set of wrapped keys using the KEK corresponding to client device 110. This decryption may remove the encapsulation from the one or more cryptography keys. In some embodiments, after unwrapping the one or more cryptographic keys using the KEK, cryptography server 150 may translate the one or more cryptographic keys to a WBC format corresponding to WBC library 130. In this manner, client device 110 may identify and/or decrypt the received working keys using WBC library 130. This process also establishes a secure communication channel between cryptography server 150 and client device 110. At 535, cryptography server 150 may transmit the one or more cryptographic keys to client device 110.

Figure 6:
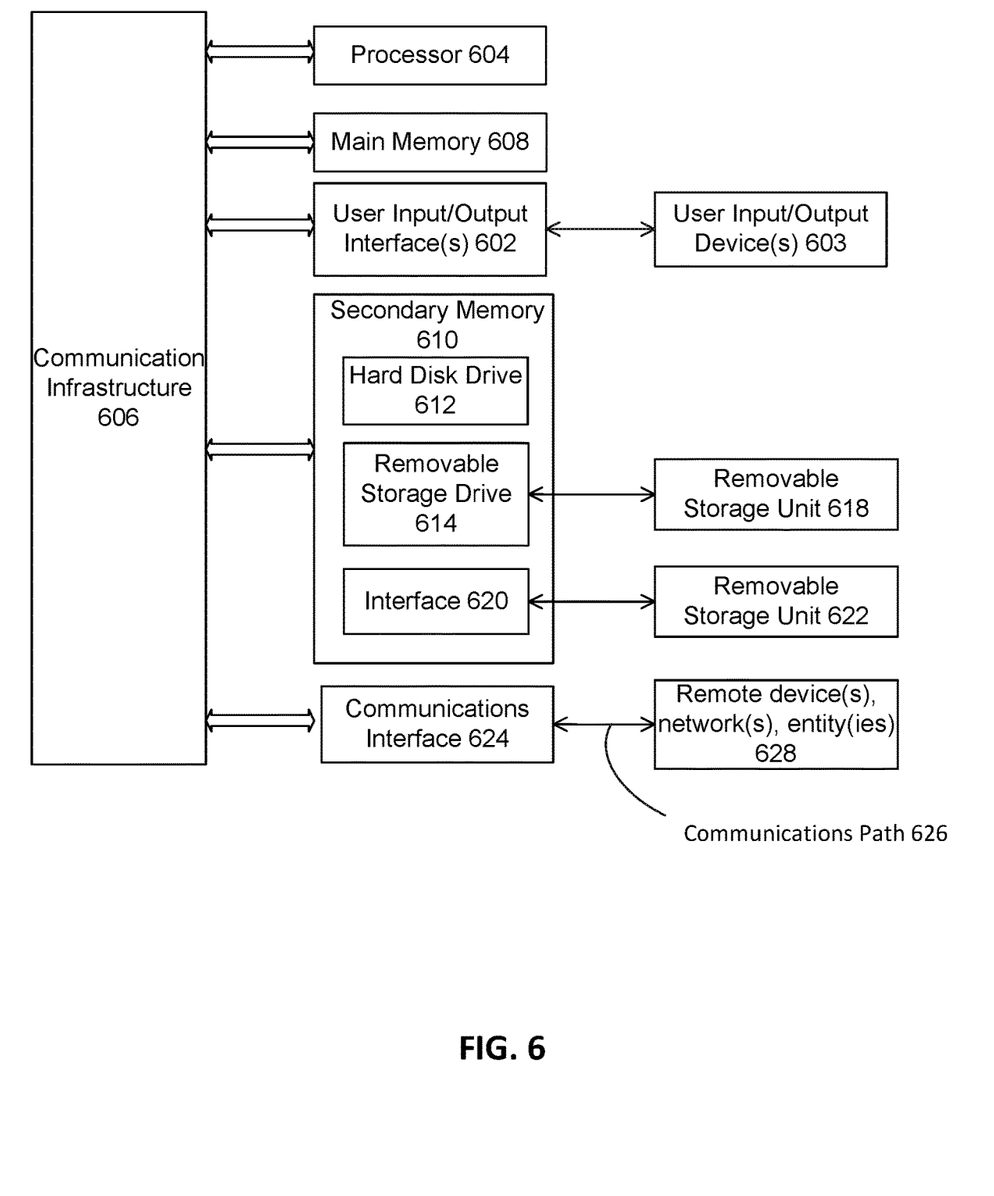
FIG. 6 depicts an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    downloading an application at a client device;
    performing, at the client device, an application login process with a cryptography server, wherein the application login process determines whether to authorize the client device at the cryptography server;
    in response to determining that the client device is authorized, transmitting, from the client device to the cryptography server, (i) an application identification corresponding to a key from an operating system key store on the client device and (ii) a device identification specific to an instance of the application on the client device;
    receiving, at the client device from the cryptography server, a device fingerprint generated using the application identification and the device identification;
    applying, at the client device, the application identification, the device identification, and the device fingerprint to a white-box cryptography library as a root of trust; and
    storing, at the cryptography server, the application identification, the device identification, the device fingerprint, and a mapping to the client device, wherein the mapping indicates a one-to-one relationship between the cryptography server and the client device.

2. The computer implemented method of claim 1, further comprising:
    transmitting, from the client device to the cryptography server, a request for one or more cryptographic keys, wherein the request includes the device fingerprint.

3. The computer implemented method of claim 2, wherein the one or more cryptographic keys are in a white-box cryptography format.

4. The computer implemented method of claim 2, further comprising:
    receiving, at the client device from the cryptography server, the one or more cryptographic keys; and
    encrypting, at the client device, communications with the cryptography server using the one or more cryptographic keys.

5. The computer implemented method of claim 1, wherein the downloading further comprises:
    downloading the application from a digital application store.

6. The computer implemented method of claim 1, where the transmitting further comprises:
    transmitting the application identification and the device identification from the client device via an API call.

7. A computer implemented method performed by a cryptography server, comprising:
    receiving a login request from a client device accessing an application installed on the client device;
    determining that the login request is allowed;
    in response to determining that the login request is allowed, generating a device fingerprint using an application identification corresponding to a key from an operating system key store on the client device and a device identification specific to an instance of the application on the client device;
    transmitting the device fingerprint to the client device; and
    storing the application identification, the device identification, the device fingerprint, and a mapping to the client device, wherein the mapping indicates a one-to-one relationship between the cryptography server and the client device.

8. The computer implemented method of claim 7, wherein determining that the login request is allowed further comprises:
    checking a policy server using one or more login credentials provided by the client device to determine whether the one or more login credentials correspond to a login restriction; and
    determining that the login request is allowed when the login restriction does not apply to the one or more login credentials.

9. The computer implemented method of claim 7, wherein generating the device fingerprint further comprises:
    encoding the application identification and the device identification using a cryptographic algorithm to generate the device fingerprint.

10. The computer implemented method of claim 7, further comprising:
    receiving a request from the client device for one or more cryptographic keys, wherein the request includes the device fingerprint;
    identifying the one or more cryptographic keys based on the device fingerprint received from the client device; and
    transmitting the one or more cryptographic keys to the client device.

11. The computer implemented method of claim 7, further comprising:
    generating one or more cryptographic keys for encrypted communications with the client device;
    encrypting the one or more cryptographic keys with a key encryption key (KEK) to generate a set of wrapped keys, wherein the KEK is unique to the device fingerprint; and
    storing the set of wrapped keys and the KEK in a key repository with an index corresponding to the device fingerprint.

12. The computer implemented method of claim 11, further comprising:
    receiving a request for the one or more cryptographic keys from the client device, wherein the request includes the device fingerprint;
    decrypting the set of wrapped keys using the KEK corresponding to the device fingerprint to obtain the one or more cryptographic keys; and
    transmitting the one or more cryptographic keys to the client device.

13. The computer implemented method of claim 11, further comprising:
    rotating the KEK according to a periodic time interval to generate a second KEK; and
    encrypting the one or more cryptographic keys with the second KEK.

14. A cryptography server, comprising:
    a memory; and at least one processor coupled to the memory and configured to:
- receive a login request from a client device accessing an application installed on the client device;
- determine that the login request is allowed;
- in response to determining that the login request is allowed, generate a device fingerprint using an application identification corresponding to a key from an operating system key store on the client device and a device identification specific to an instance of the application on the client device;
- transmit the device fingerprint to the client device; and
- store the application identification, the device identification, the device fingerprint, and a mapping to the client device, wherein the mapping indicates a one-to-one relationship between the cryptography server and the client device.

15. The cryptography server of claim 14, wherein to determine that the login request is allowed, the at least one processor is further configured to:
- check a policy server using one or more login credentials provided by the client device to determine whether the one or more login credentials correspond to a login restriction; and
- determine that the login request is allowed when the login restriction does not apply to the one or more login credentials.

16. The cryptography server of claim 14, wherein to generate the device fingerprint, the at least one processor is further configured to:
- encode the application identification and the device identification using a cryptographic algorithm to generate the device fingerprint.

17. The cryptography server of claim 14, wherein the at least one processor is further configured to:
- receive a request from the client device for one or more cryptographic keys, wherein the request includes the device fingerprint;
- identify the one or more cryptographic keys based on the device fingerprint received from the client device; and
- transmit the one or more cryptographic keys to the client device.

18. The cryptography server of claim 14, wherein the at least one processor is further configured to:
- generate one or more cryptographic keys for encrypted communications with the client device;
- encrypt the one or more cryptographic keys with a key encryption key (KEK) to generate a set of wrapped keys, wherein the KEK is unique to the device fingerprint; and
- store the set of wrapped keys and the KEK in a key repository with an index corresponding to the device fingerprint.

19. The cryptography server of claim 18, wherein the at least one processor is further configured to:
- receive a request for the one or more cryptographic keys from the client device, wherein the request includes the device fingerprint;
- decrypt the set of wrapped keys using the KEK corresponding to the device fingerprint to obtain the one or more cryptographic keys; and
- transmit the one or more cryptographic keys to the client device.

20. The cryptography server of claim 18, wherein the at least one processor is further configured to:
- rotate the KEK according to a periodic time interval to generate a second KEK; and
- encrypt the one or more cryptographic keys with the second KEK.

* * * * *